US006961370B2

(12) United States Patent
Chappell

(10) Patent No.: US 6,961,370 B2
(45) Date of Patent: Nov. 1, 2005

(54) SWEEP METHOD USING DIGITAL SIGNALS

(75) Inventor: Daniel K. Chappell, Fishers, IN (US)

(73) Assignee: Acterna, Indianapolis, IN (US)

( * ) Notice: Subject to any disclaimer, the term of this patent is extended or adjusted under 35 U.S.C. 154(b) by 961 days.

(21) Appl. No.: 09/821,582

(22) Filed: Mar. 29, 2001

(65) Prior Publication Data

US 2002/0141494 A1 Oct. 3, 2002

(51) Int. Cl.[7] .......................... H04B 17/00; H04Q 1/20
(52) U.S. Cl. ...................... 375/224; 375/316; 329/371; 348/726; 348/731; 455/67.11
(58) Field of Search ................................ 375/224, 225, 375/228, 229, 232, 262, 265, 272, 279, 316, 375/324, 329, 334, 340, 344, 346; 455/20, 455/42, 75, 67.13, 67.11; 329/300, 304, 341, 329/371; 348/725, 726, 731, 735

(56) References Cited

U.S. PATENT DOCUMENTS 4,007,423 A 2/1977 Dickinson
4,207,431 A 6/1980 McVoy
4,685,065 A 8/1987 Braun et al.
4,710,969 A 12/1987 Fluck, Jr. et al.
5,073,822 A 12/1991 Gumm et al.
5,175,626 A * 12/1992 White ........................ 348/731
5,233,418 A 8/1993 Gumm et al.
5,394,185 A 2/1995 Bernard
5,404,161 A * 4/1995 Douglass et al. ............. 725/15
5,473,361 A 12/1995 Penney
5,495,203 A * 2/1996 Harp et al. ................. 329/306
5,673,293 A * 9/1997 Scarpa et al. ............... 375/321
5,711,001 A * 1/1998 Bussan et al. ........... 455/432.1
5,867,206 A 2/1999 Voght et al.
6,233,274 B1 * 5/2001 Tsui et al. .................. 375/227

* cited by examiner

*Primary Examiner*—Young T. Tse
(74) *Attorney, Agent, or Firm*—Maginot, Moore & Beck

(57) ABSTRACT

An apparatus, system, and method, for determining the total frequency response of a communication system, include one or more testers each having a tuner, digital demodulation circuitry, and a controller that measures an absolute power level at the tester location for a particular channel and that measures a relative frequency response for the channel based on the tap weight coefficients from the digital demodulation circuitry. The absolute and relative measurements are combined and then recorded by each tester. The combined values of two or more testers are compared to determine the total frequency response of the communication system. The relative response measurements are converted from time domain to frequency domain by fast Fourier transformation. The controllers maintain a channel plan for sequencing the sweeping of consecutive channels.

30 Claims, 4 Drawing Sheets

64-QAM

SWEEP METHOD USING DIGITAL SIGNALS

FIELD OF THE INVENTION

The invention relates to a method, system, and apparatus for providing a high resolution, non-intrusive determination of frequency response for a cable television (CATV) network carrying one or more digital channels.

BACKGROUND OF THE INVENTION

Digital television signal broadcasting has several advantages over traditional analog television signal broadcasting. A digital data channel, as with an analog channel, is susceptible to noise, but so long as the received signal overcomes a threshold signal-to-noise level, the transmission is essentially error-free. Channel distortion and noise can be corrected in a digital system by using adaptive equalizers, as well as various error correction and error tolerance methods. Employing coding techniques overcomes channel-related signal impairments and optimizes bandwidth efficiency. Therefore, digital television signals are less susceptible to image distortion and interference. As a result, digital television signals require less bandwidth for comparable image and sound quality.

A typical digital cable television (CATV) system transforms an analog television (TV) signal into a linear pulse-code-modulation (PCM) digital representation of an image. Processing of the transmitted digital signals is done according to a particular application, the processing including frame synchronization and time-base correction, correction for luminance and chrominance error, image manipulation that allows digitally generated effects and graphics to be added to an image, and data compression.

Converting an analog signal to a digital signal is achieved by means of an analog-to-digital (A/D) converter. The A/D typically consists of four components: a band-limiting anti-aliasing filter, a sample-and-hold circuit that samples the analog signal, a quantizing unit that divides the range of each analog signal sample into a number of distinct levels, and an encoder that places a specified code on the output data lines for each of the quantized levels.

A receiver of the digital signals typically includes a digital-to-analog (D/A) converter having a digital input register in which the bits of a received word are stored, a decoder for converting the data lines into the number of quantized distinct analog levels, a resampling circuit for correcting distortion error introduced by the sample-and-hold, and a band-limiting filter.

Although a digital communication system can be made essentially error-free, the transmission over a physical medium is still susceptible to misalignment, temperature-related drift, and induced noise and impedance variation. The variations due to the physical medium and the system's analog components can be analyzed using various tests. One such test is a sweep test.

A frequency sweep test involves performing measurements over a range of frequency values in order to obtain frequency response information. In order to frequency sweep test a communication system such as a CATV system, a conventional test setup may use a headend test unit connected to the CATV system at its headend and a remote test unit connected to the CATV system at a desired location. In a conventional test, the headend unit sends frequency sweep test signals over the network to a remote test unit. Telemetry signals are utilized to coordinate the operation of the remote test unit with the headend test unit. The headend test unit sequentially injects test signals at each channel frequency and the remote test unit measures signal strength for each respective frequency. The remote test unit determines the frequency response of the CATV system based the results of the sweep test.

A problem with the conventional frequency sweep test is that it disrupts service to the CATV subscribers because the injected test signal interferes with their reception of the corresponding channel. In order to correct this problem, a conventional sweep test system uses a transmission scheme that has a controller which stores a list of channel frequencies to be swept, so that a test signal is generated and transmitted for a particular channel frequency only if a TV signal is not being transmitted on that channel, and the television signals themselves are used as test signals on those channels having a current TV transmission.

Such prior non-invasive sweep systems, however, are designed for use with analog CATV channels that carry television signals having the NTSC format. To this end, the prior sweep systems perform measurements based upon certain standard pulses within the analog television signal. For example, analog sweep tests often rely on vertical synchronization pulses in the performance of measurements because they are predictable in both magnitude and occurrence. Such analog sweep systems are not applicable to digital television signals, which do not include such pulses (e.g., sync pulses). Moreover, such prior art systems often provide limited resolution, typically a single measurement per channel.

A method and apparatus for sweep testing a digital broadband television signal has been defined by U.S. Pat. No. 6,061,393, issued to Tsui, et al. However, the method therein described only computes an estimate of a system response that is then deconvolved to isolate particular components. In addition, that method requires that an impulse be fed into the system and, thus, can be invasive.

Accordingly, there is a need for a sweep measurement method that is non-invasive and can be used on digital communication channels. There is a further need for such a system that has improved resolution over prior art non-invasive systems.

SUMMARY OF THE INVENTION

The present invention satisfies the above-stated need, as well as others, by providing a method of determining a frequency response of a channel by obtaining a relative frequency response of the channel and an overall channel signal strength. The present method combines these obtained values to generate an absolute level frequency response. The use of an absolute level frequency response allows the frequency response for the measured channel to be combined with frequency response information from other channels, digital or analog, to obtain a system frequency response of high resolution and which may be accomplished in a non-invasive manner.

A method of determining a frequency response of a communication system includes tuning to a selected digital channel frequency, obtaining an absolute signal strength measurement for the selected digital channel frequency, obtaining relative frequency response measurements for the particular selected digital channel, and combining the relative frequency response measurements and the absolute signal strength to obtain an absolute level frequency response for the selected digital channel.

An apparatus for determining a frequency response of a communication system includes a tuner operative to tune to a selected digital channel frequency band, and a measurement circuit. The measurement circuit is operative to obtain absolute signal strength measurements for the selected digital channel frequency band, and obtain relative frequency response measurements for the selected digital channel frequency band. The measurement circuit is further operative to combine the relative frequency response measurements and the absolute signal strength measurements to obtain an absolute level frequency response for the selected digital channel frequency band.

The above described embodiments provide a channel response on an absolute scale that has relatively high resolution. Because the response is on an absolute scales, the channel response may be combined with other absolute channel responses to obtain a system response of relatively high resolution. Optionally response for frequencies between channels may be interpolated.

The above-described features and advantages, as well as others, will become more readily apparent to those of ordinary skill in the art by reference to the following detailed description and accompanying drawings.

DETAILED DESCRIPTION

Figure 1:
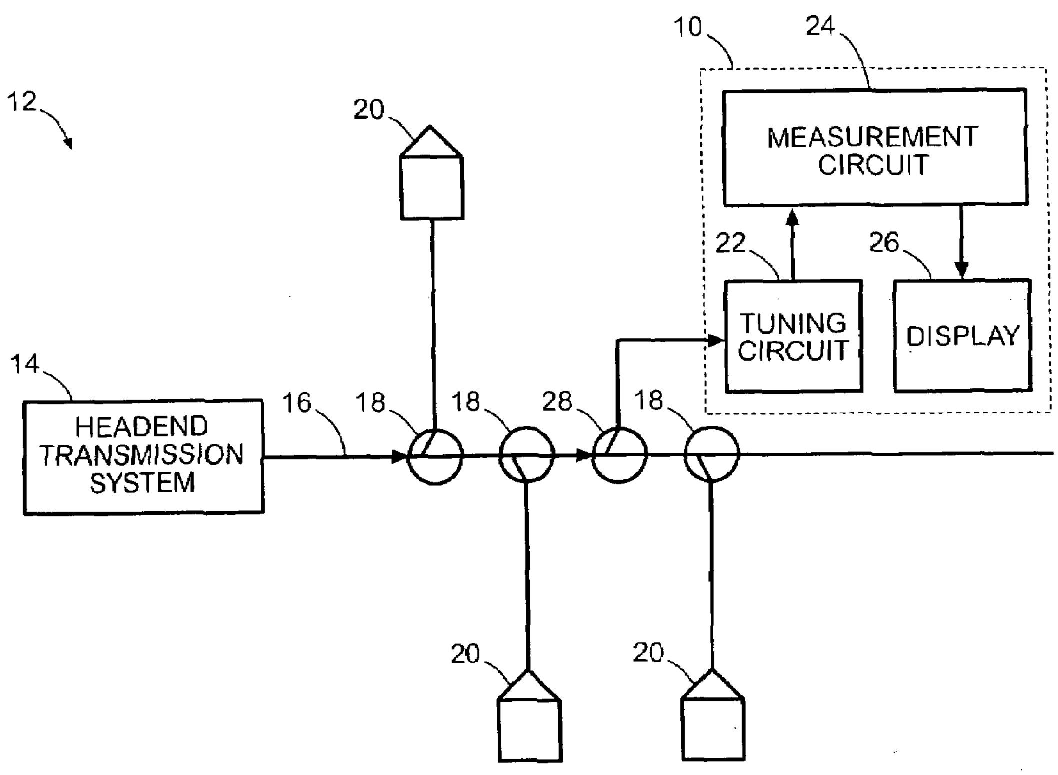
FIG. 1 is a block diagram illustrating an exemplary communication system for transmission of broadband signals and testing a frequency response of the system.

FIG. 1 shows a frequency response measurement device 10 according to the present invention implemented within a communication system 12. The communication system 12 comprises a CATV distribution system and includes a headend transmission system 14, a distribution network 16, and a plurality of splitters 18 disposed along the distribution network 16. It will be noted that the communication system 12 is shown in greatly simplified form, although it is representative of the general configuration of all terrestrial CATV distribution systems.

The frequency response measurement device 10 includes a tuning circuit 22 connected to the distribution network 16 via one of the splitters 18, a measurement circuit 24 connected to the output of the tuning circuit 22, and in the preferred embodiment described herein, a display 26 for displaying the results output by the measurement circuit 24. The tuning circuit 22 is operable to tune to any of a plurality of digital channels, and may suitably have a structure similar to that of an ordinary digital television receiver. The tuning circuit 22 receives a broadband television signal and generates a single digital channel signal therefrom.

The measurement circuit 24 is a circuit that is operable to receive a digital channel signal and generate an absolute level frequency response for the digital channel signal. To this end, the measurement circuit 24 is operable to obtain an absolute signal strength measurement for the entire digital channel frequency band. The measurement circuit 24 is further operable to obtain a relative frequency response measurement for the digital channel frequency band. The measurement circuit 24 is then operative to combine the absolute signal strength measurement with the relative frequency response to generate an absolute level frequency response for the digital channel frequency band. The measurement circuit 24 is also preferably operative to cause the tuning circuit 22 to tune automatically to one or more subsequent digital channel signals and obtain absolute level frequency responses for the subsequent digital channels. The measurement circuit 24 is preferably also operative to intepolate an absolute level frequency response between a maximum value of the absolute level frequency response of one channel and a minimum level of the absolute level frequency response of the other channel. In this manner, the absolute level frequency responses from several channels may combined to obtain a system frequency response having a relatively good resolution.

In the general operation of the communication system 12, the headend transmission system 14 transmits a broadband signal that includes a plurality of digital channels onto the distribution network. The digital channels constitute carrier frequencies modulated using digital modulation techniques such as QPSK or QAM, techniques widely known in the art. Each digital channel occupies a defined digital channel frequency band within the broadband signal. The broadband signal propagates from the distribution network 16 to each of a plurality of subscriber systems 20. The subscriber systems 20 include one or more television receivers (not shown) that selectively receive one of the channels of the transmitted broadband signal.

From time to time it is advisable to obtain the frequency response of the communication system at one or more channel frequencies including those in which a digitally modulated signal is normally transmitted. To this end, the measurement device 10 is coupled to the distribution network 16 to obtain measurements therefrom. In particular, the tuning circuit 22 may be coupled to the distribution network 16 via a coupler 28.

The tuning circuit 22 then tunes to a select digital channel and provides the select digital channel to the measurement circuit 24 as an intermediate frequency ("IF") channel signal. The measurement circuit 24 first obtains an overall signal strength measurement for the channel. The measurement circuit 24 further obtains a relative frequency response of the IF digital channel signal. The relative frequency response of a digital channel may typically be derived from the tap weights or coefficients of an adaptive equalizer or filter within the receiving circuitry. The resulting frequency response has relatively high resolution.

Further detail regarding an exemplary technique for obtaining a digital channel signal strength measurement and a relative frequency response measurement is provided below in connection with FIGS. 2 to 6. The measurement circuit 24 then combines the overall signal strength measurements with the relative frequency response to obtain an absolute level frequency response for the digital channel. The tuning circuit then tunes to a subsequent digital channel. The measurement circuit 24 obtains an absolute level frequency response for the subsequent digital channel using the techniques described above. The tuning circuit 22 may then tune to additional channels and the measurement circuit 24 may obtain absolute level frequency responses for such additional channels. The accumulated absolute level frequency responses may then be stored and/or displayed.

However, there is often a gap between the highest frequency of one channel and the minimum frequency of the next adjacent channel. To address this gap, the measurement circuit 24 preferably intepolates between the highest (maximum) frequency of one digital channel's absolute frequency response and the lowest (minimum) frequency of the next channel's response. The combination of the measured and intepolated response provides a continuous response over at least a multichannel portion of the bandwidth of the overall system.

In accordance with the present invention, the measurement circuit 24 combines the absolute signal strength with the relative frequency response of the channel to obtain an absolute level frequency response of the selected digital channel.

The absolute level frequency response is useful for a number of test purposes. For example, the measurement device 10 maybe employed to obtain absolute frequency response for several channels which may be combined to provide a wideband frequency response. If only the relative signal levels were used, such a wideband frequency response would provide the frequency responses of the various channels without proper context.

The absolute level frequency response may also be combined with the frequency sweep results of ordinary analog channel responses to obtain a wideband frequency response. To this end, the absolute level frequency response may be combined with results from a conventional non-invasive analog sweep tester to provide an overall system response for a system that includes analog and digital channels. Alternatively, the measurement device 10 may itself be modified to also perform analog sweep testing. To this end, the measurement circuit 24 may be modified to include analog television measurement functionality such as that described in U.S. Pat. No. 5,585,842, which is incorporated herein by reference.

The absolute level frequency response generated by the measurement circuit 24 of the present invention is also useful in determining the frequency response of one or more portions of the distribution network 16. In particular, the degradation of the measured frequency band can be determined by comparing the absolute level frequency responses from different locations in the distribution network 16.

One reason the measurement circuit 24 of the exemplary embodiment of the present invention obtains a relative frequency response separate from the absolute signal strength is that a significant amount of frequency response information of a digital QAM or QPSK signal may be obtained through the partial or complete demodulation process, as taught by U.S. Pat. No. 6,061,393 issued to Tsui et al. However, information obtained through digital signal demodulation omits the overall received signal strength, and thus only provides relative frequency response information.

Figure 2:
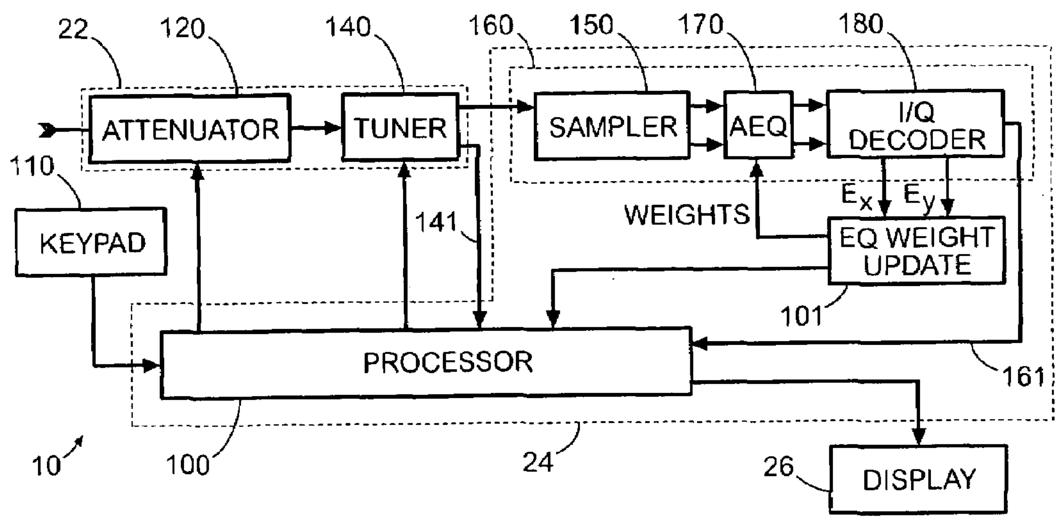
FIG. 2 is a simplified block diagram illustrating a testing unit for sweep testing according to an embodiment of the invention.

FIG. 2 shows an exemplary embodiment of the measurement device 10 of FIG. 1. In FIG. 2, the tuning circuit 22 further comprises an attenuator 120 coupled to a tuner 140. The measurement circuit 24 further comprises a processor 100, a QAM demodulator 160, and an I/Q decoder 180. The measurement device 10 further comprises a keypad 110.

The processor 100 may suitably be a microprocessor, microcontroller, or a combination of either or both devices with a digital signal processor (DSP) and/or discrete digital circuitry that performs processing functions as described herein. The processor 100 is preferably coupled to control the operation of the attenuator 120 and the tuner 140. The processor 100 is operably coupled to cooperate with the QAM demodulator 160 to obtain relative frequency response measurements. The processor 100 is further coupled to the tuner 140 to receive raw signal strength information therefrom.

The exemplary QAM demodulator 160 shown in FIG. 2 includes a sampler 150, an adaptive equalizer 170, and an I/Q decoder 180. The sampler 150 receives the baseband signal from the tuner 140 and outputs digitized signals to the adaptive equalizer 170. The I/Q decoder 180 is connected to receive the output signals from the adaptive equalizer 170 and generate equalizer update signals via an update mechanism 101. The equalizer update mechanism 101 outputs tap weight coefficients to the adaptive equalizer 170 in a feedback manner.

Figure 5:
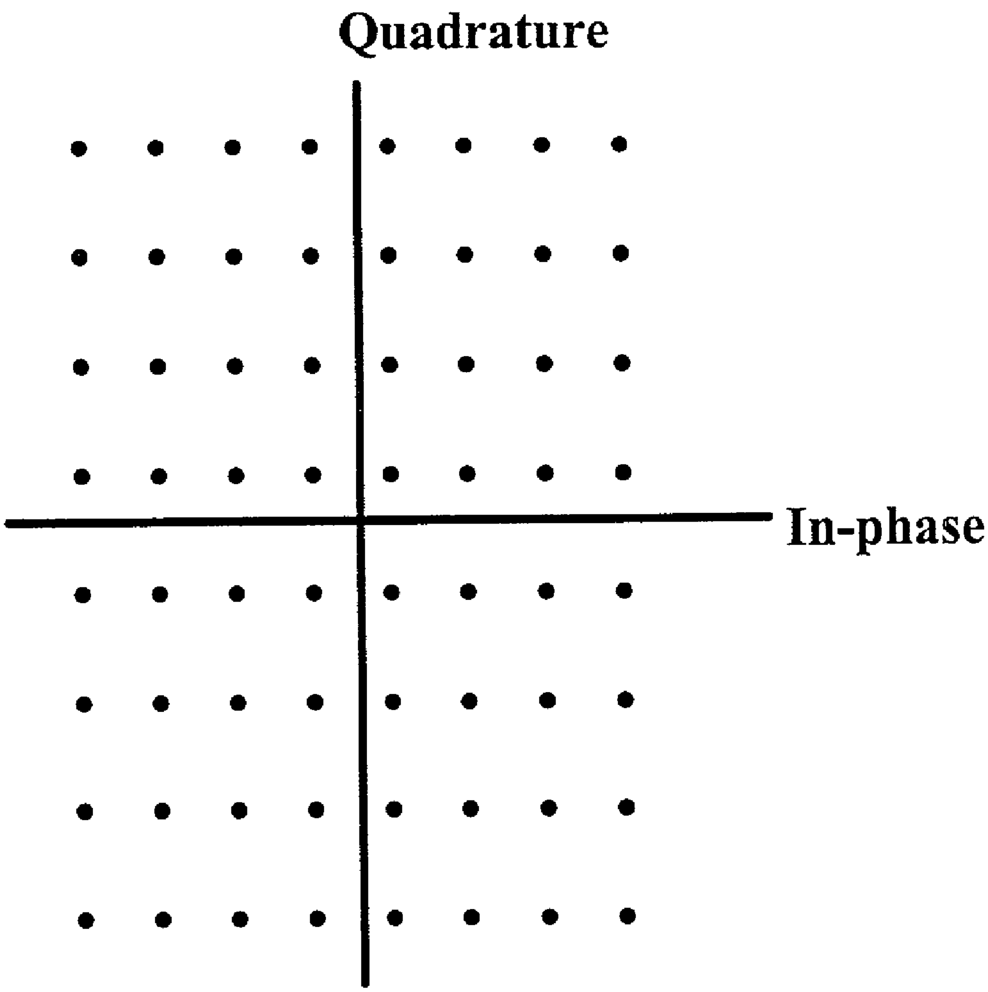
FIG. 5 is a depiction of an ideal QAM-64 constellation.

The sampler 150 is operative to digitize the tuner output signal to provide values I, Q that correspond to a QAM grid of signals, ideally shown by way of example in FIG. 5. The QAM signals I, Q from the sampler 150 are then adjusted by the action of the adaptive equalizer 170 in order to compensate, for example, for irregularities or variations in the distribution network 16. The I/Q decoder 180 acts as a 'symbol decider' that equates a grid point to a signal within a range of the particular grid. Thus, an I/Q decoder 180 provides a source of error information by distinguishing an ideal point on, for example, a constellation such as that shown in FIG. 5, from the corresponding constellation point as produced by the adaptive equalizer 170. This error information is provided to an update mechanism 101 as error signals $E_x$ and $E_y$.

Although the QAM modulation scheme described herein employs a tuning/downconversion stage that develops two outputs, I and Q, that correspond to each orthogonal component, the present invention is not limited to any particular modulation scheme. Moreover, the QAM demodulator 160 as illustrated in FIG. 2 is given by way of example only. The QAM demodulator 160 may readily be replaced with alternative configurations of a QAM demodulator that produce error signals from which new adaptive equalizer weights may be generated.

The EQ weight update mechanism 101 is a functional block that is operative to adjust the weights of the adaptive equalizer 170 based on error signals $E_x$ and $E_y$ received from the I/Q decoder 180. The update mechanism 101 may be a part of the I/Q decoder 180 or the processor 100, or may constitute a separate device or circuit. Update mechanisms that generate update equalizer weights are known. As will be discussed below, the updated equalizer weights are used by the adaptive equalizer to improve the receive digital signal as is known in the art, and are also used by the processor to generate the relative frequency response for the channel.

In operation, a keypad 110 inputs the desired test criteria to a processor 100. An input broadband signal is fed to an attenuator 120 that actively changes its characteristics in order to obtain a maximum swing (dynamic range) within the associated sampler 150. The attenuated input signal then propagates to the tuner 140, which provides the chosen band as an intermediate frequency signal to the demodulation 160.

The tuner 140 further provides raw signal strength information on signal line 141 to the processor 100. The raw signal strength information may suitably be instantaneous amplitude information such as that produced by a log amp detector or the like. The processor 100 converts the raw signal strength information into absolute signal strength measurements for the received digital channel. Such absolute signal strength measurements are also used to calibrate the tuner output based on a predetermined reference for each channel. The processor 100 may generate absolute signal strength measurements using any known technique for generating absolute signal strength measurements of a digital television signal, including those taught in U.S. Pat. No. 6,041,076 to Franchville, et al., U.S. patent application Ser. No. 09/259,508 to Chappell, now abandoned, or U.S. patent application Ser. No. 09/282,735 to Bowyer, now abandoned, all of which are incorporated herein by reference.

Figure 3:
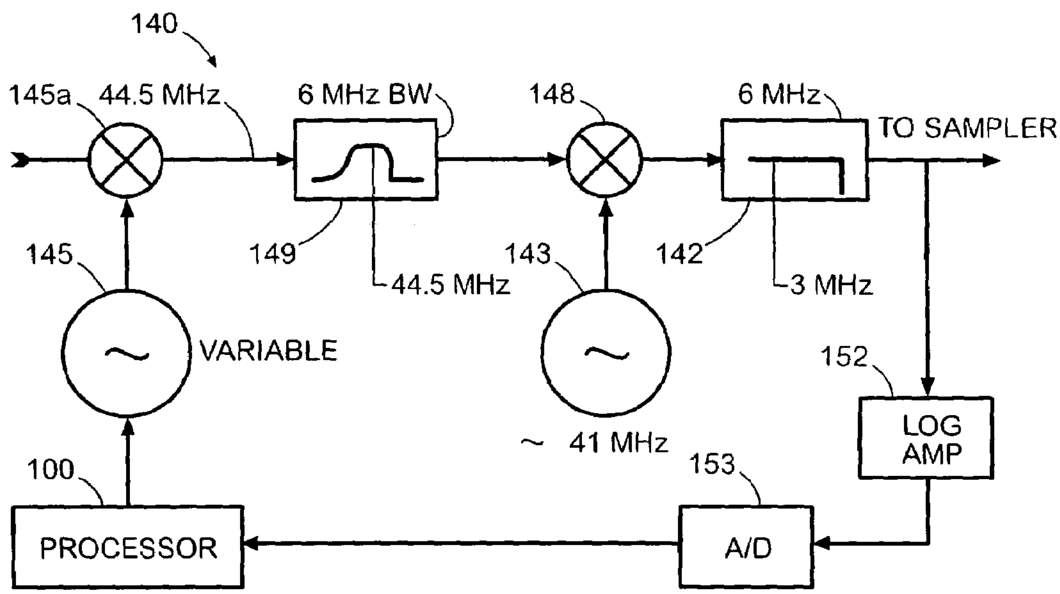
FIG. 3 is a simplified representation of a mixer and lowpass filter used to convert a tuner output to a baseband signal according to an embodiment of the invention.
Figure 4:
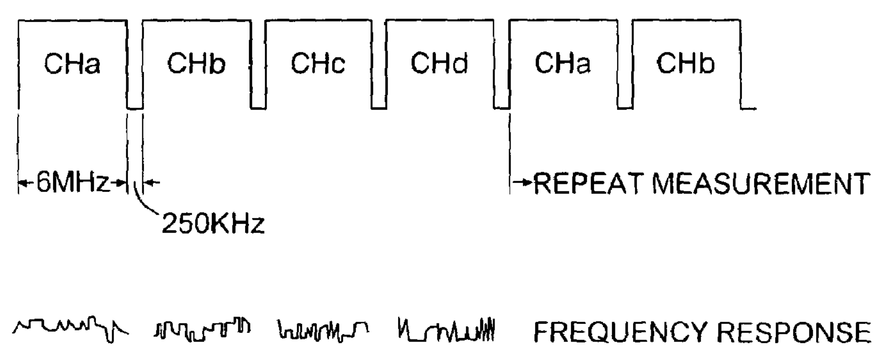
FIG. 4 illustrates an output of the sweep tester having frequency response information for four channels.

FIG. 3 shows in further detail an exemplary embodiment of the tuner 140 of FIG. 2. The tuner 140 employs IF bandwidth filters so that the IF signal has a 6 MHz bandwidth, as is well-known, e.g., Triad manufactures such a tuner for cable modems and settop boxes. The exemplary tuner 140 includes a two stage mixing arrangement where a variable voltage-controlled oscillator (VCO) 145 generates a frequency for mixing with the incoming broadband signal in order to produce a predetermined first IF frequency at approximate 44.5 MHz. The 44.5 MHz. frequency is chosen for convenience and for the benefit of using commercially available component, such as the bandpass filter 149.

The VCO 145 frequency is controlled by a control signal line from the processor 100. The frequency of the VCO 145 is chosen such that the mixer 145*a* will convert the desired channel frequency to 44.5 MHz. For example, if the selected channel has a center frequency of 100 MHz, the processor 100 generates a voltage that causes VCO 145 to produce a frequency of 55.5 MHz, which is mixed with the 100 MHz broadband signal to produce the 44.5 MHz IF signal. The 44.5 MHz IF signal thus contains the desired channel. The bandpass filter 149 effectively filters out all but the 6 MHz bandwidth channel centered at 44.5 MHz.

The second stage of mixing converts the 44.5 MHz IF signal to baseband by mixing the frequency from local oscillator 143 with the IF signal (6 MHz bandwidth) using the mixer 148. The lowpass filter 142, combined with the mixer 148 and local oscillator 143, produce a baseband IF signal having a center frequency of approximately 3 MHz and a bandwidth of 6 MHz, the low pass filter 142 assuring that the baseband IF signal has a sharp cutoff at the 6 MHz band. The tuner 140 baseband output signal propagates to the sampling circuit 150 of the QAM demodulator 160 (See FIG. 2).

The baseband IF signal may also propagate to a device such as a log amp detector 152, which generates the raw signal strength information used by the processor 100 to determine absolute signal strength. The log amp detector 152 is operable to generate an analog signal having a DC voltage level that is representative of the magnitude of the input IF signal. The log amp detector 152 is operably coupled to provide the analog signal to an A/D converter 153, which generates digital values representative of the raw signal strength. The A/D converter 153 then provides the digital values over line 141 to the processor 100.

Referring again to FIG. 2, the quadrature amplitude modulation (QAM) demodulator 160 demodulates the tuner 140 baseband IF output. To this end, the demodulator 160 may suitably comprise a sampler 150, an adaptive equalizer 170, and an I/Q decoder 180.

The sampler 150 converts the downconverted signal from the tuner 140 to a discrete-time digital representation of the raw in-phase (I) and quadrature (Q) components. The sampler 150 may be implemented by synchronizing the sampling rate to an external signal such as the input broadband signal or by directly using a sampling rate control signal. Such methods are known. Alternatively, an A/D converter (not shown) can be used to sample, for example, an input centered at an IF, a fixed sampling rate and IF being chosen in relation to the spectrum of the modulation signal so as to enable digital quadrature direct conversion to baseband by a digital QDC stage (not shown).

The adaptive equalizer 170 adjusts the I and Q values to correct for channel distortion. The adaptive equalizer 170 automatically corrects for distortions in the channel and typically includes a digital finite impulse response (FIR) filter and/or infinite impulse response (IIR) filter (not shown) with variable tap weights. In the exemplary embodiment described herein, the adaptive equalizer is an impulse response filter having various tap coefficients.

According to the invention, coefficients that correspond to adjustment of the tap weights are generated by the adaptive equalizer 170. The adjustment time, when the tap weight coefficients are generated, is at or after the time the adaptive equalizer 170 acquires lock. In particular, as more I and Q samples are received, the adaptive equalizer 170 eventually achieves a relatively stable set of tap coefficients. At this time, the adaptive equalizer 170 is said to have "acquired lock".

The I/Q decoder 180 decodes the two orthogonal components, I and Q, and generates error signals $E_x$, and $E_y$ by comparing the ideal response characteristics to the data generated by the adaptive equalizer 170. The I/Q decoder 180 examines the data output from adaptive equalizer 170 and estimates, or assigns, the I and Q values of the transmitted data based on rules that are specific to the modulation scheme being used. A channel decoding scheme may also be used to remove effects of forward error correction or other channel coding schemes being applied to the data.

After the various coding schemes are accounted for, the decoder 180 generates the error signals $E_x$ and $E_y$ that correspond to the respective differences between the ideal modulation signals and the output of the adaptive equalizer 170. The two-dimensional error signal $E_x$, $E_y$ is provided to the weight update mechanism 101.

The weight update mechanism 101 performs statistical analysis on accumulated samples of the error signal $E_x$ and $E_y$ to generate updated equalizer weights. In particular, the weight update mechanism 101 generates weights corresponding to variance of the baseband signal in a particular frequency band. The calculation of appropriate update weights or coefficients based on received error signals is well known, and may be carried out by commercially available chip sets. For example, the VCM3352 chip set available from Broadcom is capable of providing such adaptive equalizer update information.

The processor 100 also receives the tap weight coefficients or tap weights from the update mechanism 101. The tap weight coefficients, as they exist once the equalizer 170 acquires lock, represent the inverse of the response of the channel in the time domain. The processor 100 transforms the tap weights into a relative frequency response for the channel by performing a Fast Fourier Transform (FFT). The processor 100 then adds the relative frequency response data to the absolute signal strength result based on the raw signal strength information in order to generate the absolute level frequency response.

The processor 100 then causes the tuner 140 to tune to a new channel and repeat the process. The result is an absolute level frequency response for multiple channels. The frequency response a larger portion of the broadband signal spectrum may then be provided as a sequential stream of the individual responses of the multiple channels, as shown using four channels in FIG. 4. To accommodate the gap between adjacent channels, the frequency response between each channel may be interpolated.

FIG. 5, illustrates a signal constellation for a representative modulation scheme that uses a 64 point QAM. A signal constellation is a graphical representation of the possible symbols for a given modulation scheme. The horizontal and vertical axes correspond to the orthogonal components I and Q of the modulation signal. Each possible signal is represented by a point at the position of its associated (I,Q) coordinates. As shown in FIG. 5, 64 point QAM is represented as an array of 64 points. Since $\log_2(64)=6$, the choice of one particular symbol for transmission during a given symbol period can be identified using 6 bits of information. Accordingly, the coefficient produced, for example, by the I/Q decoder 180 can be identified as a relative value by reference to its QAM coordinates. The modulation control 166 (not shown) can also be based on QAM coordinates for simplifying the relative frequency response measurement.

A method of performing a sweep test of the communication system is illustrated by reference to FIG. 6. In the headend, the channel plan is created at step 200 and includes, among other things, information identifying the channel frequencies to be tuned to during the sweep. The channel plan may be communicated to the field unit via a variety of methods, including through transmission of telemetry information over an empty channel.

In either the headend or a field unit, a first channel under test is then selected by initializing the tuning to the digital channel at step 201. At that point, two separate operations take place. First, the absolute system response is determined using the raw signal strength information measurement, obtained from tuner 140, at step 202. Second, the relative response for each channel is measured in steps 206 and 207.

After step 202, step 203 is performed. At step 203, the attenuator parameters are adjusted and recorded before or while the equalizer acquires lock in step 206. It is noted that the steps 202, 203, 204, 206, and 207 can each be repeated as necessary in an iterative process, so that the single blocks shown in FIG. 6 can each represent a number of cycles or iterations rather than merely single steps. In addition, groups of two or more steps can be performed as nested loops (not shown).

In step 206, the system acquires lock and then maintains a dwell time on a particular channel long enough to demodulate the channel's signal. In general, demodulators provide an interrupt or other signal notification to indicate when lock is acquired. After lock is acquired, step 207 is performed. In step 207, an FFT is performed on the adaptive equalizer coefficients. The resultant values constitute the relative frequency response data.

After steps 203 and 207 are completed, step 204 is performed. In step 204, the relative frequency response data is added to the absolute signal strength information result. Thereafter, in step 205, the resultant communication system frequency response is stored and displayed for each channel. The display can be normalized for a scale common to all channels or can be set to display a relative indication compared to, e.g., a historical average.

After step 205, step 208 is performed. In step 208, the processor determines whether the channel under test is the last channel to be tested. If not, then the next channel is selected at step 209. It is noted that the next channel can be tuned while the computations of step 204 and possibly 207 are being made, or while a previous value is being displayed in step 205. If, however, it is determined at step 208 that the last channel to be tested has been tested, then step 210 is performed.

In step 210, an extrapolation is performed between the maximum value of a given channel and the minimum value of a corresponding next adjacent channel. A straight line approximation is typically used for the extrapolation. The result of the extrapolation can either subsequently be displayed or stored at step 211, or can be displayed or stored during the sweep. Finally, the method is repeated by returning to step 201 and causing the tuner 140 to tune to the first digital channel of the channel plan.

It will be noted that the extrapolation step 210 need not be executed only after the last channel has been measured. Likewise, the display and/or storage of the results in step 205 need not take place as each channel is measured. Indeed, all of the storage and/or display may simply take place in step 211, thereby eliminating step 205. Those of ordinary skill in the art may readily determine the order of those steps that best fits their implementation needs.

Figure 6:
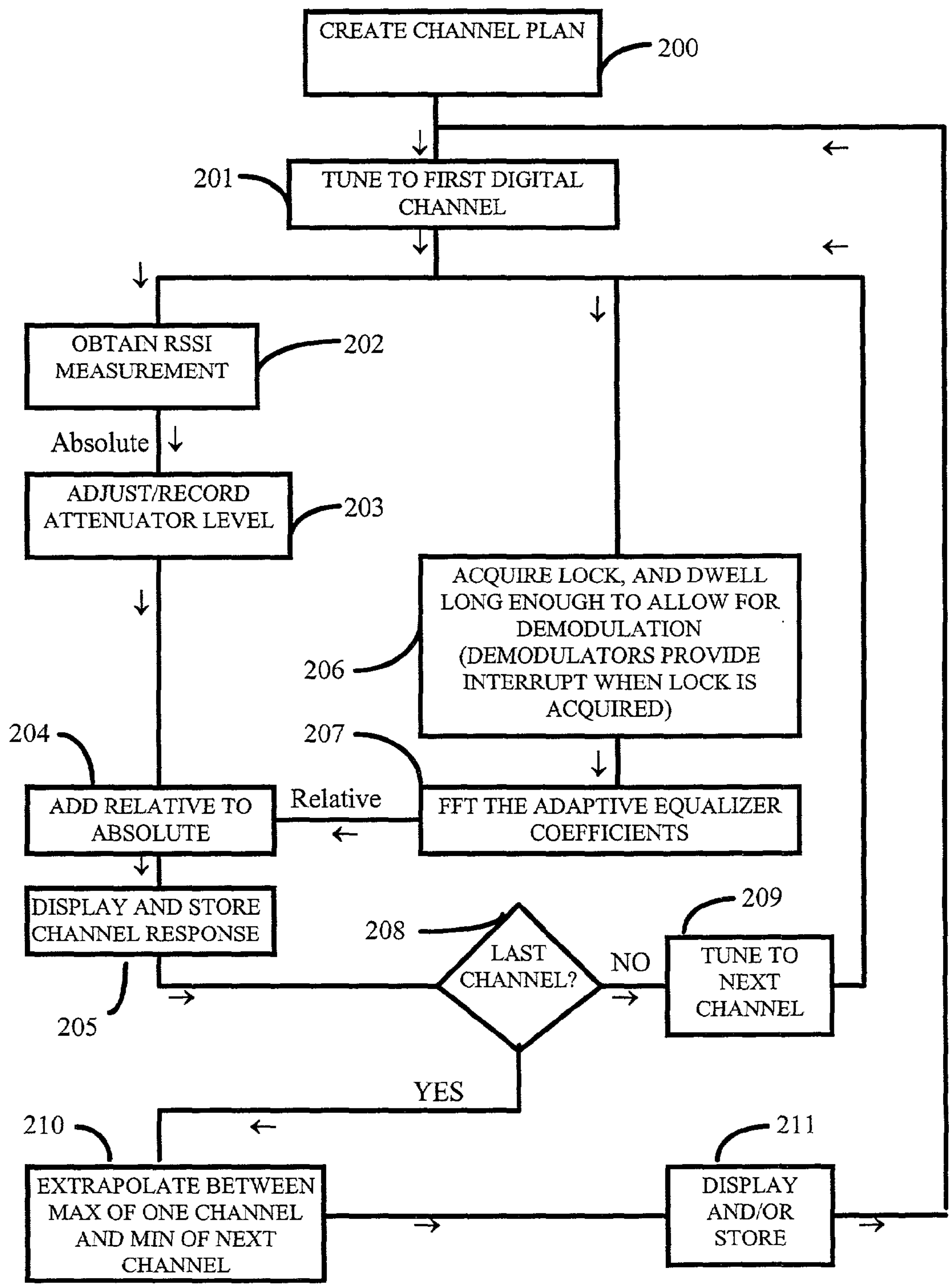
FIG. 6 is a flowchart showing an exemplary method for determining the frequency response of a communications system according to the present invention.

Although a preferred method is described using the flowchart of FIG. 6, in accordance with the present invention, any variation that utilizes a processor to determine the absolute signal level based on the raw signal strength information, and performs an FFT on the adaptive equalizer coefficients to generate relative frequency response information, to then combine the relative frequency response information with the absolute signal strength information, is envisaged. By repeatedly combining the relative and absolute information to generate system frequency response in an iterative process, a high level of accuracy can be achieved in a sweep test of a communication system without the need for an intrusive method.

The head end test unit sweeps the communication system by either generating and transmitting test signals at the digital channel frequencies or, if a television signal is being transmitted on a channel, using the television signal as the test signal. The remote test unit receives the information transmitted by the head end test unit and preferably sweeps the same frequencies simultaneously with the head end test unit.

Optionally, depending upon a particular implementation, additional steps may include a headend transmitting information to a field unit, a receiver transmitting information to a headend, and either the headend or the field unit subtracting the corresponding measurements of the two units to obtain a system frequency response. The transmitted information may include any partial or complete channel data, the raw signal strength information measurements' data, and/or timing information. As discussed above, the method described herein may be combined with non-intrusive methods of performing sweep measurements on analog CATV channels to obtain an overall system response in a system that employs both digital and analog signals.

What is claimed is:

1. A method of determining a frequency response of a communication system, comprising:

tuning to a selected digital channel frequency;

obtaining an absolute signal strength measurement for said selected digital channel frequency;

obtaining relative frequency response measurements for said selected digital channel frequency; and combining said relative frequency response measurements and said absolute signal strength measurement to obtain an absolute level frequency response for said selected digital channel frequency.

2. The method according to claim 1, further comprising displaying said absolute level frequency response.

3. The method according to claim 1, further comprising storing said absolute level frequency response.

4. The method according to claim 1, further comprising:

automatically tuning to a frequency of a subsequent digital channel;

obtaining a subsequent absolute signal strength measurement for said subsequent digital channel frequency;

obtaining subsequent relative frequency response measurements for said subsequent digital channel frequency; and combining said subsequent relative frequency response measurements with said subsequent absolute signal strength measurement to obtain a subsequent absolute level frequency response.

5. The method according to claim 4, wherein a frequency band exists between a maximum frequency of said absolute level frequency response and a minimum frequency of said subsequent absolute level frequency response, further comprising extrapolating between a maximum frequency absolute level response of said absolute level frequency response and a minimum frequency absolute level response of said subsequent absolute level frequency response.

6. The method according to claim 1, wherein said relative frequency response measurements are obtained by:

obtaining relative time domain measurement values from the selected digital channel frequency; and performing a fast Fourier transformation of said relative time domain measurement values.

7. The method according to claim 6, further comprising determining whether said selected digital channel frequency corresponds to a last channel specified by a channel plan.

8. The method according to claim 7, wherein said channel plan includes a list of digital channels to be sequentially tuned, each digital channel having a corresponding digital channel frequency, and wherein if said selected digital channel frequency corresponds to said last channel then the method further comprises extrapolating between a maximum value of an absolute level frequency response for one channel of said list of digital channels and a minimum value of an absolute level frequency response for a next adjacent channel of said list of digital channels.

9. The method according to claim 8, further comprising displaying a result of said extrapolation for a combination of absolute level frequency responses of said adjacent channels.

10. The method according to claim 8, further comprising storing a result of said extrapolation for a combination of absolute level responses of said adjacent channels.

11. A method of determining a frequency response of a communication system, comprising:

tuning to a frequency of a selected digital channel;

obtaining first relative frequency response measurements for said selected digital channel for a first location;

obtaining second relative frequency response measurements for said selected digital channel for a second location;

obtaining an absolute signal strength at said first location and said second location;

combining said first relative frequency response measurements and said first location absolute signal strength to obtain a first absolute level frequency response value;

combining said second relative frequency response measurements and said second location absolute signal strength to obtain a second absolute level frequency response value; and comparing said first absolute level frequency response value from said second absolute level frequency response value to obtain said frequency response of the communication system.

12. The method according to claim 11, wherein said first relative frequency response measurements are obtained by:

obtaining time domain measurement values from said selected digital channel frequency; and performing a fast Fourier transformation of said time domain measurement values.

13. The method according to claim 11, further comprising displaying said frequency response of the communication system.

14. The method according to claim 11, further comprising storing said frequency response of the communication system.

15. The method according to claim 11, further comprising determining whether said selected digital channel is a last channel specified by a channel plan.

16. The method according to claim 11, further comprising tuning to a frequency of a subsequent digital channel and obtaining a subsequent frequency response of the communication system.

17. The method according to claim 16, further comprising extrapolating between a maximum frequency absolute level response of the frequency response and a minimum frequency absolute level response of said subsequent frequency response.

18. The method according to claim 17, further comprising displaying a result of said extrapolation.

19. The method according to claim 17, further comprising storing a result of said extrapolation.

20. The method according to claim 16, further comprising repeating the method by returning to the frequency of said selected digital channel, wherein said selected digital channel is a first channel on a list of channels.

21. An apparatus for sweep testing a communication system, comprising:

a tuner;

digital demodulation and decoding circuitry configured to receive a signal at a selected channel frequency from said tuner and configured to output adaptive equalizer weights; and a controller having a channel list, said controller operative to select in sequence, via said tuner, every channel listed for a desired frequency band, to measure and record absolute power for each respective selected channel, to acquire lock for a predetermined time on each respective selected channel, to measure and record a relative frequency response of each respective selected channel based on said adaptive equalizer weights during each corresponding channel lock time, and to combine the absolute power measurement with the corresponding relative frequency response measurement for each selected channel to output a system frequency response based on said combined measurements.

22. The apparatus as claimed in claim 21, wherein said controller performs a fast Fourier transformation on said adaptive equalizer weights in order to determine said relative frequency response measurement of each respective selected channel.

23. The apparatus as claimed in claim 21, further comprising a storage device for storing said absolute power and relative frequency response measurements.

24. The apparatus as claimed in claim 21, further comprising a display device operative to display at least one of said absolute power measurement, said relative frequency response measurement, and said system frequency response.

25. The apparatus as claimed in claim 21, wherein said digital demodulation and decoding circuitry includes an adaptive equalizer and an I/Q decoder.

26. An apparatus for determining a frequency response of a communication system, comprising:

a tuner operative to tune to a selected digital channel frequency band; and a measurement circuit, said measurement circuit operative to:

obtain an absolute signal strength measurement for said selected digital channel frequency band;

obtain relative frequency response measurements for said selected digital channel frequency band; and combine said relative frequency response measurements and said absolute signal strength measurements to obtain an absolute level frequency response for said selected digital channel frequency band.

27. The apparatus as claimed in claim 26, wherein said measurement circuit includes a processor.

28. The apparatus as claimed in claim 26, wherein said measurement circuit further includes a QAM demodulator and an I/Q decoder.

29. The apparatus as claimed in claim 26, further comprising a display for displaying the absolute level frequency response.

30. The apparatus as claimed in claim 26, wherein said tuner is further operative to automatically tune to a subsequent digital channel frequency band, and wherein said measurement circuit is further operative to obtain a subsequent absolute level frequency response for said subsequent digital channel frequency band.

* * * * *